(12) United States Patent
Joo

(10) Patent No.: US 6,240,586 B1
(45) Date of Patent: Jun. 5, 2001

(54) UNBALANCE DETECTING DEVICE AND METHOD OF WASHING MACHINE

(75) Inventor: Ki-Hun Joo, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/421,381

(22) Filed: Oct. 20, 1999

(30) Foreign Application Priority Data

Mar. 26, 1999 (KR) .................................................. 99-10519

(51) Int. Cl.$^7$ ...................................................... D06F 33/02
(52) U.S. Cl. ............................. 8/159; 68/12.06; 68/12.14
(58) Field of Search ............................... 8/159; 68/12.06, 68/12.14

(56) References Cited

U.S. PATENT DOCUMENTS 5,720,066 * 2/1998 Kim .................................. 68/12.06 X
6,047,428 * 4/2000 Min .................................. 68/12.06 X

\* cited by examiner

Primary Examiner—Philip R. Coe
(74) Attorney, Agent, or Firm—Robert E. Bushnell, Esq.

(57) ABSTRACT

An unbalance detecting method of a washing machine, wherein an unbalanced mass of a washing machine is accurately detected and classified according to input voltage variation when the unbalance is detected utilizing a ripple width of a current by a current sensor, thereby preventing errors from occurring in spin-dry process, the method comprising the steps of increasing the speed of the motor to a predetermined revolution per minute (rpm); detecting a variation of an AC input voltage according to input voltage detecting means; detecting a ripple current of an AC input current according to input current detecting means; obtaining a difference between a maximum value and a minimum value of a ripple current detected by the input current detecting step to thereby determine whether a ripple width of the current is larger than a predetermined value; calculating an unbalanced mass according to the input voltage value detected at the input voltage detecting step when it is determined that the ripple width of the current is not larger than the predetermined value; and controlling the speed of the motor according to the unbalanced mass calculated at the unbalanced mass calculating step to perform a spin-dry operation.

6 Claims, 5 Drawing Sheets

| RIPPLE WIDTH OF CURRENT ACCORDING TO UNBALANCE | | UNBALANCED MASS[g] | | |
|---|---|---|---|---|
| | | 0 | 400 | 800 |
| INPUT VOLTAGE[V] | 185 | 0 mV | 20 mV | 40 mV |
| | 220 | | 30 | 60 |
| | 260 | | 40 | 70 |

UNBALANCE DETECTING DEVICE AND METHOD OF WASHING MACHINE

CLAIM OF PRIORITY

This application makes reference to, incorporates the same herein, and claims all benefits accruing under 35 U.S.C. §119 from an application for UNBALANCE SENSING METHOD OF A WASHING MACHINE earlier filed in the Korean Industrial Property Office on Mar. 26, 1999 and there duly assigned Serial No. 10519/1999.

BACKGROUND OF THE INVENTION

1. Field of the Invention

The present invention relates to an unbalance detecting device and method of a drum washing machine having a 3-phase induction motor operated by an inverter circuit, and more particularly to an unbalance detecting device and method of a washing machine by detecting input voltage variations as well as variations of current ripple thereby providing a more accurate detection of unbalanced mass.

2. Description of the Prior Art

Generally, a drum washing machine includes, as illustrated in FIG. 1, a body 1, a detergent can 3, a manipulating unit 5, both disposed on front upper side of the body 1, and hot and cold water supply valves 7 and 8 connected to a faucet (not shown) for supplying hot and cold water.

The body 1 is in turn disposed with a tub 9 in which there is arranged with a rotatory drum for washing and spin-drying the laundry. The tub 9 is provided at a front side thereof with a diaphragm 15 for coupling a door 13 for opening and closing when the laundry is tossed in or taken out. The tub 9 is disposed at a front side thereof with a balance weight 19 for preventing vibration generated from a high speed rotation of the drum 11 during washing and spin-dry operations.

The diaphragm 15 is disposed thereon with an air vent 17 for inducing dry air during drying operation of the laundry. The air vent 17 is arranged therein with a drying heater 21 for drying air induced from outside.

The drying heater 21 is formed at one side thereof with a fan motor 23 for blowing high-temperature air provided by the drying heater 21 to the drum 11 via the diaphragm 15.

The tub 9 is connected at a periphery thereof to a condensing hose 25 for supplying cold water to condense the dried air infused into the tub from the drying heater 21, and the tub 9 is provided thereunder with rotation force generating means of 3-phase induction motor 27 (hereinafter referred to as motor) for rotating the drum 11 in the forward and reverse directions.

The body 1 is mounted at a rear lower side thereof with a drainage pump 29 for draining the washing water in the tub 9 through a drainage hose (not shown) and at a front lower side thereof with a filter 31 for preventing the drainage pump 29 from being clogged by residual water, filth and the like flowed out from the tub 9 and for draining the washing water in case the drainage pump 29 could not operate due to, such as blackout.

The drum 11 is formed at overall surfaces thereof with a plurality of through holes 11a for allowing the washing water in the tub 9 to flow into the drum 11. The drum 11 is provided therein with a water flowage adjusting member 11b performing as a laundry paddle for allowing the laundry to tumble in the drum 11 and pulling up and dropping the laundry. Each of the water flowage adjusting members is spaced 120° apart from one another.

In the conventional drum washing machine thus described, when a user inserts the laundry (clothes) into the drum, manipulates the manipulating unit 5 to input a desired washing condition (according to the kind of laundry, temperature, washing course, dry time and the like) and presses an operation button, washing water is supplied into the tub 9 from a faucet (not shown) through the hot and cold water valves 7 and 8.

When the washing water is supplied into the tub 9, the drum 11 is rotated at a high speed in forward and reverse directions according to the operation of the motor 27 in order to form water flowage in the supplied washing water and to apply physical force to the laundry, thereby separating grime, foreign objects and the like stained on the laundry, and then the laundry passes through the washing, rinsing and drying processes.

Ripple width of electrical current supplied to the motor 27 during the spin-dry operation is proportional to unbalanced mass generated by eccentricity of laundry when the drum rotates at a high speed, such that the ripple width of the current is detected by a current sensor, and the detected ripple width of current is compared with a size of a predetermined ripple width. Then, if the detected rippled width of the current is larger than the predetermined value, the spin-dry operation is stopped or changed to the fabric unravelling operation.

However, according to the conventional method, since only the rippled width of current generated by the unbalanced mass could be detected, when an abnormal voltage, which is lower (~195 volts) or higher (250 volts~) than the normal voltage, is applied, data from the ripple width of current are overlapped so as to make it difficult to detect accurate unbalance.

SUMMARY OF THE INVENTION

The present invention is disclosed to solve the aforementioned problem and it is an object of the present invention to provide an unbalance detecting method of a washing machine adapted In to accurately detect and determine an unbalanced mass of a washing machine according to an input voltage variation while detecting unbalance by utilizing a ripple width of a current detected by a current sensor.

In accordance with one object of the present invention, there is provided an unbalance detecting device of a washing machine, the device for detecting unbalanced mass generated by eccentric laundry according to high speed rotation of a motor, the device comprising:

input voltage detecting means for detecting an Alternating Current (AC) input voltage;

input current detecting means for detecting an Alternating Current input current; and control means for comparing a set-up ripple width with a ripple width of the input current detected by the input current detecting means to calculate an unbalanced mass according to an input voltage value detected by the input voltage detecting means when the current ripple width is less than the set-up ripple width and to output a control signal for controlling a spin-dry speed of the motor.

In accordance with another object of the present invention, there is provided an unbalance detecting method of a washing machine including a motor, the unbalance generated by eccentricity of laundry, the method comprising the steps of:

increasing the speed of the motor to a predetermined revolution per minute (rpm);

detecting a variation of an input voltage by an input voltage detecting means;

detecting a ripple current of an input current by an input current detecting means;

obtaining a difference between a maximum value and a minimum value of a ripple current detected by the input current detecting step to thereby determine whether a current ripple width is larger than a predetermined value;

calculating an unbalanced mass according to the input voltage value detected at the input voltage detecting step when it is determined that the current ripple width is less than the predetermined value; and controlling the speed of the motor according to the unbalanced mass calculated at the unbalanced mass calculating step to perform a spin-dry operation.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A preferred embodiment of the present invention will now be described in detail with reference to the accompanying drawings.

Figure 1:
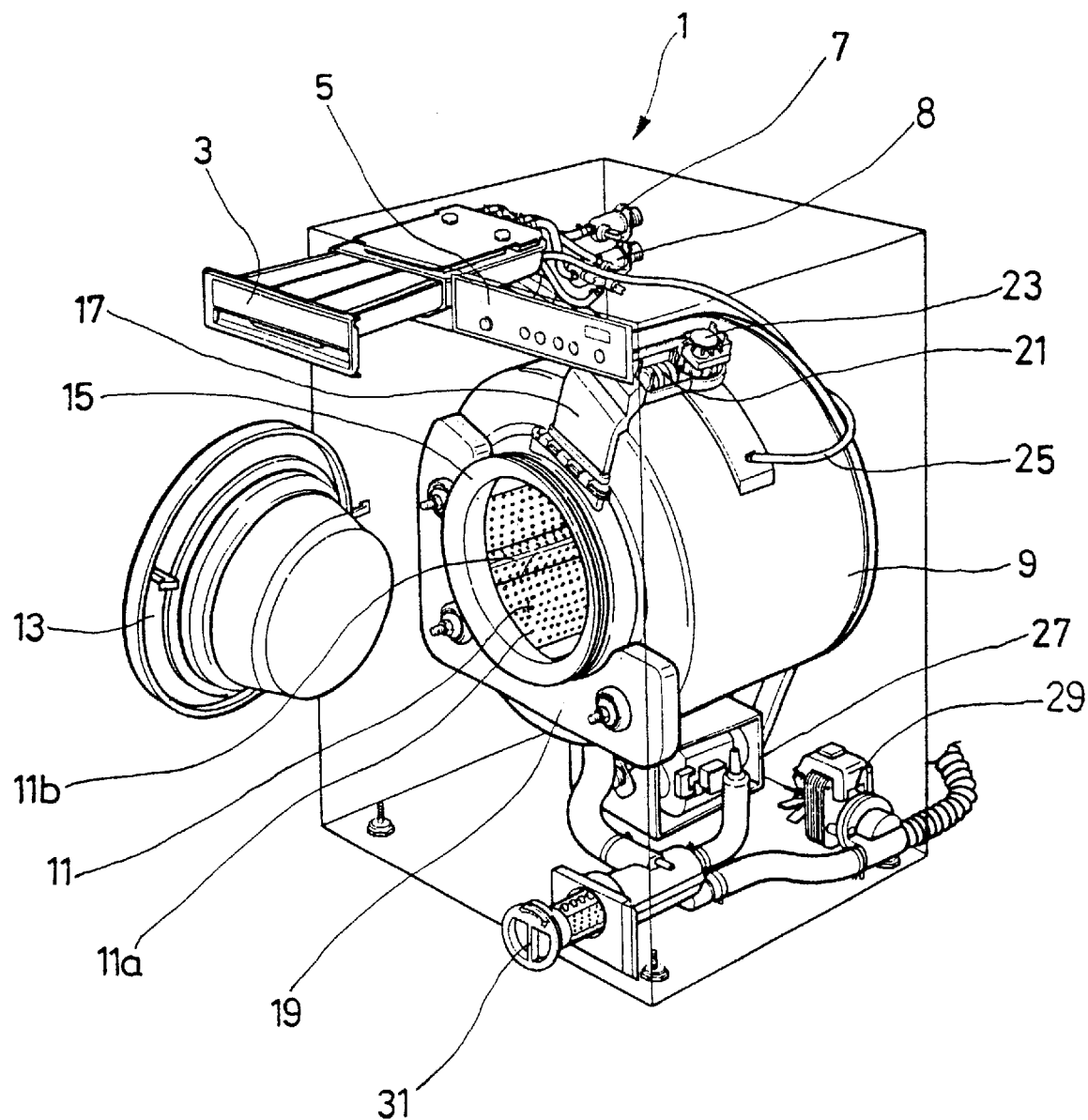
FIG. 1 is a perspective view for illustrating a drum washing machine according to the prior art.

Throughout the drawings, like reference numerals and symbols are used for designation of like or equivalent parts or portions as in FIG. 1 for simplicity of illustration and explanation, and redundant references will be omitted accordingly.

Figure 2:
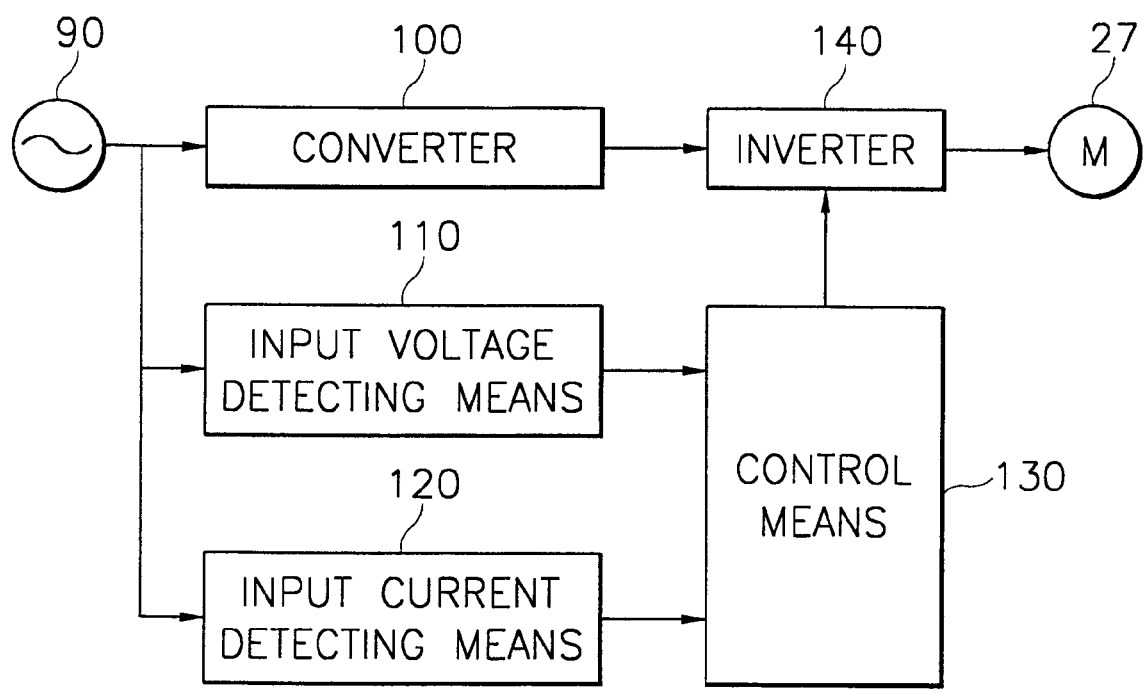
FIG. 2 is a block diagram for illustrating an unbalance detecting apparatus of a washing machine according to an embodiment of the present invention.
Figure 3:
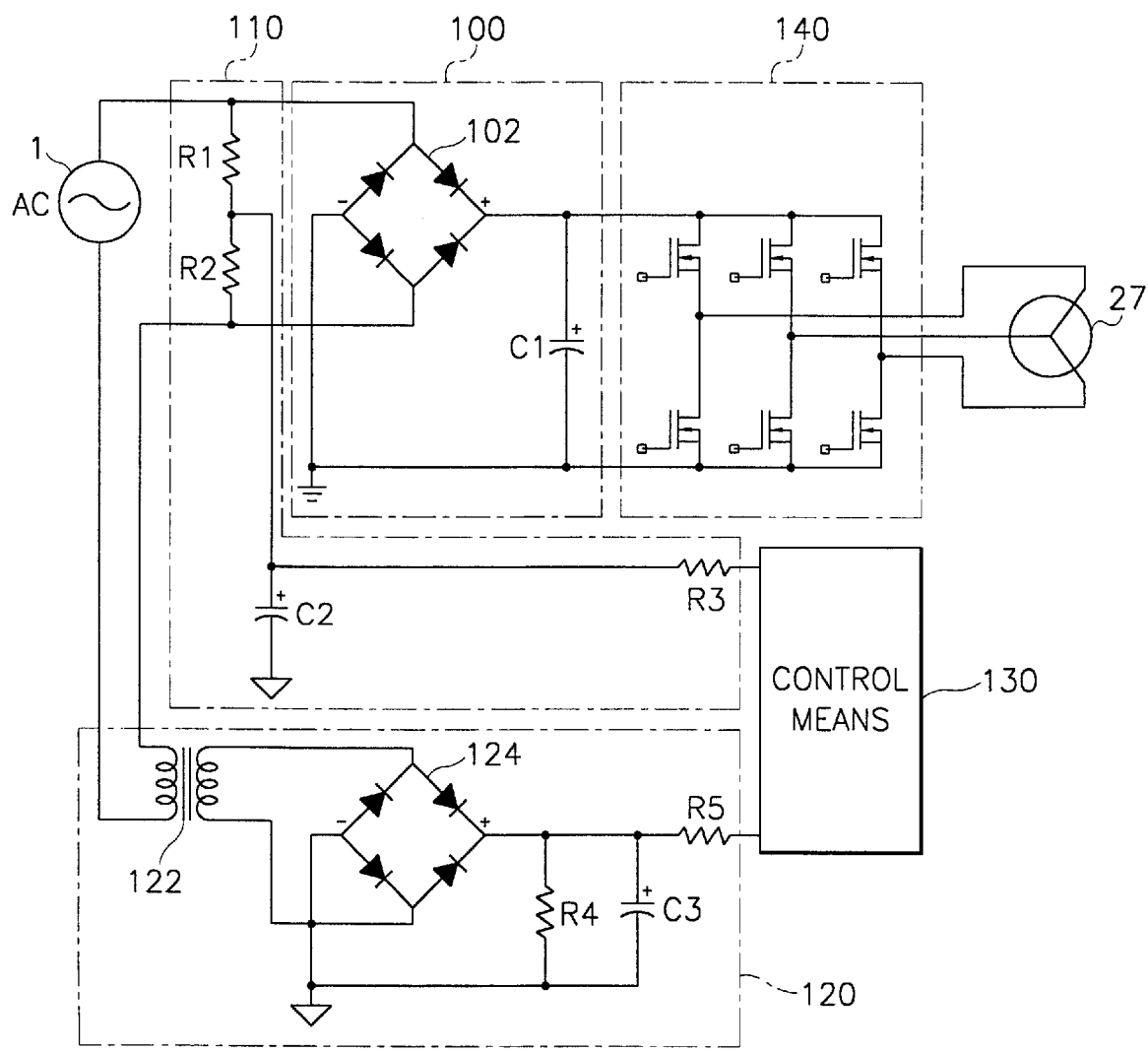
FIG. 3 is a detailed circuit diagram of an unbalance detecting apparatus of a washing machine according to an embodiment of the present invention.

As illustrated in FIGS. 2 and 3, a converter 100, serving to convert an AC input power to a DC power by rectifying and smoothing the AC input power applied from a power input terminal 90, includes a rectifier 102 for rectifying an AC input power applied from the power input terminal 90 to a predetermined DC power, and a smoothing capacitor C1 coupled to an output terminal of the rectifier 102 for filtering ripple components contained in the rectified DC power and for charging the rectified DC power.

Input voltage detecting means 110, serving to detect an AC input voltage applied from the power input terminal 90, includes dividing resistors R1 and R2 for detecting variations of the AC input voltage applied from the power input terminal 90, a capacitor C2 and a resistor R3 for smoothing the voltage divided by the dividing resistors R1 and R2. The smoothed and divided AC input voltage is input to control means 130 (described later).

Input current detecting means 120 serves to detect the AC input current applied from the power input terminal 90, and the input current detecting means 120 includes a current sensor 122 for converting a ripple current component of the input power at the terminal 90 to a voltage, a rectifier 124 for rectifying the voltage converted by the current sensor 122, a capacitor C3 and resistors R4 and R5 for smoothing the voltage rectified by the rectifier 124. The smoothed and rectified voltage is inputted to the control means 130.

Furthermore, the control means 130 classifies unbalanced mass of the washing machine with a predetermined unit according to the input voltage variations detected by the input voltage detecting means 110. Then, the control means 130 compares the ripple width of the input current detected by the input current detecting means 120 with a predetermined ripple width. Further, the control means 130 controls an eccentric adjusting and spin-dry processes according to the result of determining the unbalance mass generated by eccentricity of laundry during a high speed rotation of the drum in spin-dry process. And the control means 130 controls duty times and frequencies of 3-phase outputs according to the speed and operation condition of the motor 27.

An inverter 140 inverts the DC power provided by the converter 130 into 3-phase (U-phase, V-phase and W-phase) AC power having variable frequency and voltage for a specific speed and torque of the motor 27 by alternatively turning on and off six (6) power transistors according to a driving signal output from the control means 130.

Now, operational effect of the unbalance detecting device and method of a washing machine thus constructed according to an embodiment of the present invention will be described in detail.

Figure 6:
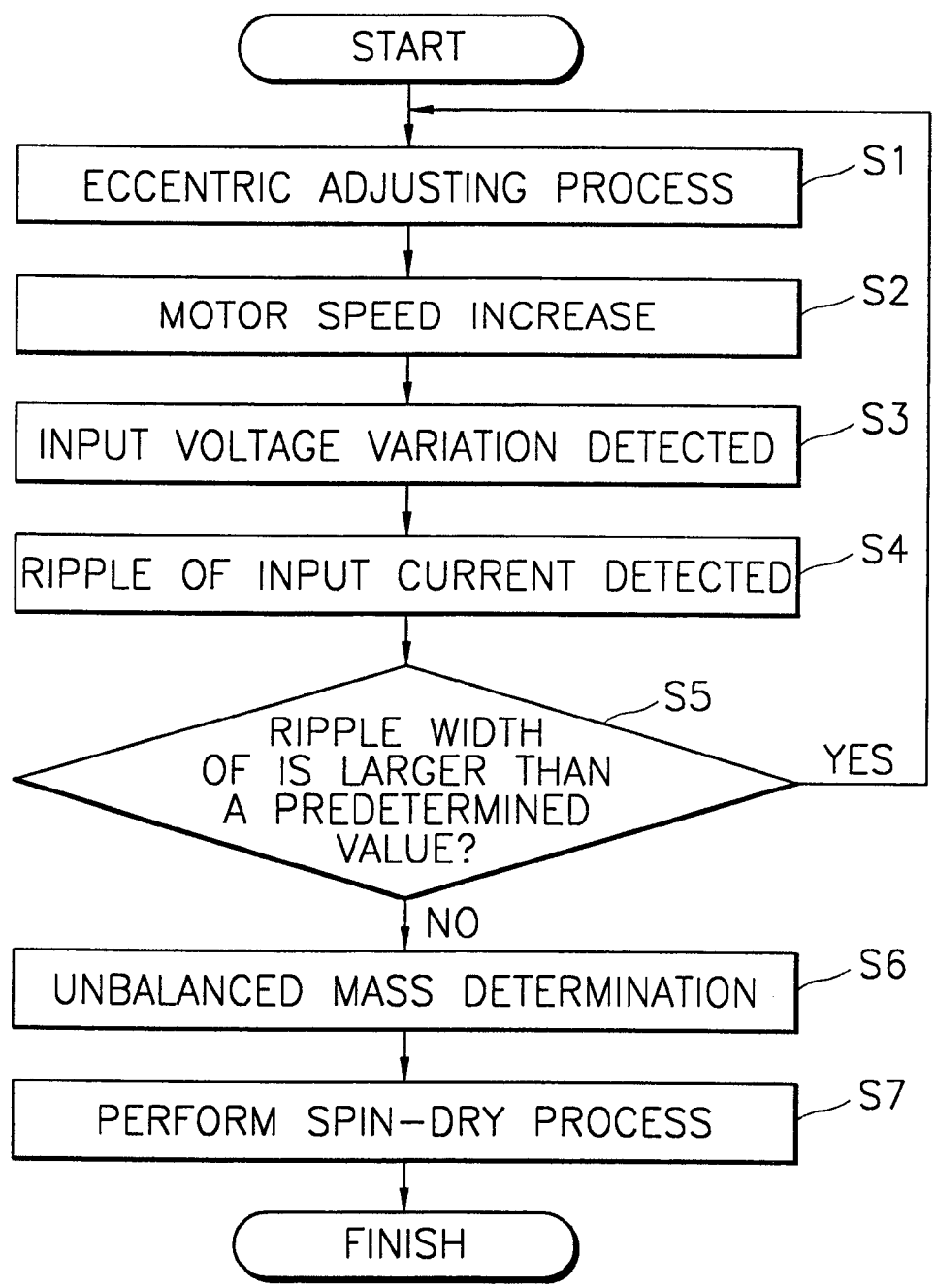
FIG. 6 is a flow chart for illustrating a sequence of steps for detecting an unbalance of a washing machine according to the present invention.

FIG. 6 is a flow chart for illustrating a sequence of steps for detecting the unbalance of the washing machine according to an embodiment of the present invention, where S means a step.

First of all, at step S1, an eccentric adjusting process of the laundry is performed and, at step S2, the rotating speed of the motor 27 is increased to 90 rpm, where the laundry is gathered up on a part of the inside wall of the drum 11, thereby resulting in the unbalance.

Figures 4, 5:
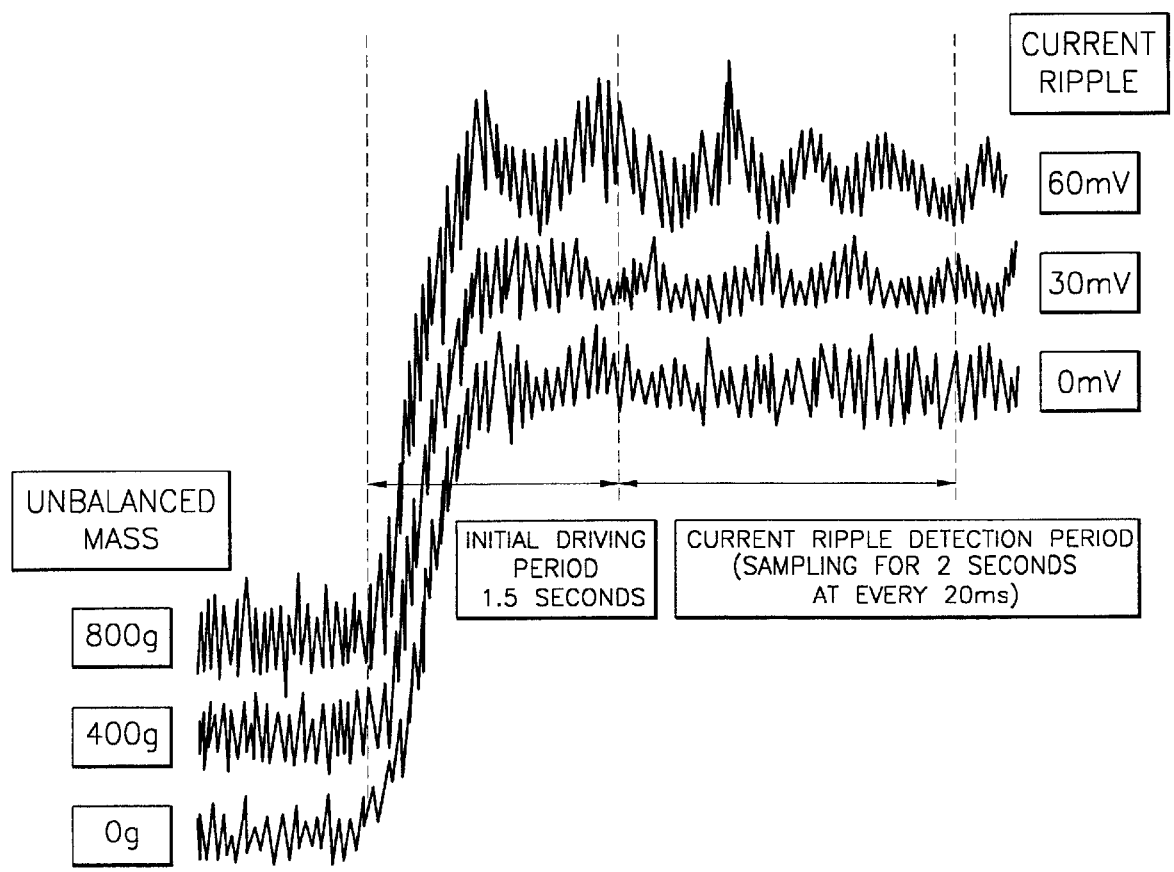
FIG. 4 is a waveform diagram of a current ripple according to an unbalanced mass of a washing machine according to an embodiment of the present invention.
FIG. 5 is a data sheet of a current ripple according to voltage variations of an embodiment of the present invention.

When the speed of the motor 27 is increased to 90 rpm, a specific amount of ripples is generated in the input current, as illustrated in FIG. 4, according to the unbalanced mass generated by eccentricity of the laundry. The current ripple width supplied to the motor 27 is proportional to the value of the unbalanced mass.

Successively, at step S3, variation of the AC input voltage inputted from the power input terminal 90 is detected by the input voltage detecting means 110, and at step S4, as illustrated in FIG. 4, the speed of the motor 27 is increased for 1.5 seconds and the ripple of the current supplied to the motor 27 is detected and sampled at every 20 ms for 2 seconds by the input current detecting means 120.

Successively, at step S5, the control means 130 obtains a difference between a maximum value and a minimum value of the ripple data of the current according to the ripple current detected by the input current detecting means 120 to determine whether the current ripple width is larger than a predetermined value.

As a result of the determination at step S5, if the current ripple width is larger than the predetermined value (in case of YES), the control means 130 interprets it as an excessive unbalance mass and then the control means returns to step S1 to perform the eccentric adjusting process of the laundry and repeatedly performs steps S1 to S5.

Meanwhile, as a result of the determination at step S5, if the current ripple width is less than the predetermined value (in case of NO), the control advances to step S6 and the control means 130 classifies the unbalanced mass of the laundry with a predetermined unit according to input voltage value detected by the input voltage detecting means 110 to determine the unbalanced mass, based thereon, as illustrated in FIG. 5.

Successively, at step S7, a spin-dry process at a speed corresponding to the unbalanced mass determined at step S6 according to the input voltage value.

As apparent from the foregoing, there is an advantage in the unbalance detecting device and method of a washing machine according to the present invention, in that an unbalanced mass of washing machine is accurately classified and detected according to input voltage variation when the unbalance is detected by utilizing a ripple width of a current of detected by a current sensor, thereby preventing errors from occurring in spin-dry process.

What is claimed is:

1. An unbalance detecting method of a washing machine comprising a motor, the unbalance generated by eccentricity of laundry, wherein the method comprising the steps of:

increasing the speed of the motor to a predetermined revolution per minute (rpm);

detecting a variation of an AC input voltage according to input voltage detecting means;

detecting a ripple current of an AC input current according to input current detecting means;

obtaining a difference between a maximum value and a minimum value of a ripple current detected by the input current detecting step to thereby determine whether a ripple width of the current is larger than a predetermined value;

calculating an unbalanced mass according to the input voltage value detected at the input voltage detecting step when it is determined that the current ripple width is less than the predetermined value; and controlling the speed of the motor according to the unbalanced mass calculated at the unbalanced mass calculating step to perform a spin-dry operation.

2. The method as defined in claim 1, wherein the motor speed increasing step comprises a step of increasing the speed of the motor to at least 90 rpm.

3. The method as defined in claim 1, wherein the input current detecting step comprises a step of sampling ripple of the AC input current for a predetermined time period after the speed of the motor is increased to the predetermined rpm to obtain ripple data.

4. The method as defined in claim 1, wherein the current step of determining the ripple width of the current comprises a step of performing an eccentricity adjusting process when it is determined that the current ripple width is larger than the predetermined value.

5. An unbalance detecting device of a washing machine, the device for detecting unbalanced mass generated by eccentric laundry according to high speed rotation of a motor, the device comprising:

input voltage detecting means for detecting an Alternating Current input voltage;

input current detecting means for detecting an Alternating Current input current; and control means for comparing a set-up ripple width with a ripple width of the input current detected by the input current detecting means to calculate an unbalanced mass according to an input voltage value detected by the input voltage detecting means when the current ripple width is less than the set-up ripple width and to output a control signal for controlling a spin-dry speed of the motor.

6. The device as defined in claim 5, wherein the control means outputs a control signal for controlling the motor to an eccentricity releasing speed when the current ripple width is larger than the set-up ripple width.

* * * * *